United States Patent [19]
Treves et al.

[11] Patent Number: 5,948,288
[45] Date of Patent: *Sep. 7, 1999

[54] LASER DISK TEXTURING APPARATUS

[75] Inventors: David Treves, Palo Alto; Thomas O'Dell, Milpitas, both of Calif.

[73] Assignee: Komag, Incorporated, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/654,452

[22] Filed: May 28, 1996

Related U.S. Application Data

[63] Continuation of application No. 08/654,452, May 28, 1996, abandoned.

[51] Int. Cl.$^6$ .................................................. B23K 26/08
[52] U.S. Cl. ............................... 219/121.68; 219/121.77; 219/121.82
[58] Field of Search .......................... 219/121.61, 121.68, 219/121.73, 121.74, 121.75, 121.76, 121.77, 121.82, 121.8, 121.78; 359/872, 876

[56] References Cited

U.S. PATENT DOCUMENTS

| | | | |
|---|---|---|---|
| 3,549,733 | 12/1970 | Caddell | 219/121.85 |
| 3,679,863 | 7/1972 | Houldcroft et al. | 219/121.72 |
| 3,778,585 | 12/1973 | Mallozzi et al. | 219/121.77 |
| 4,358,659 | 11/1982 | Spohnheimer | 219/121.68 |
| 4,626,941 | 12/1986 | Sawada et al. | |
| 4,729,766 | 3/1988 | Bergentz et al. | 219/121.69 |
| 5,062,021 | 10/1991 | Ranjan et al. | |
| 5,108,781 | 4/1992 | Ranjan et al. | |
| 5,164,324 | 11/1992 | Russell et al. | |
| 5,322,988 | 6/1994 | Russell et al. | |
| 5,528,922 | 6/1996 | Baumgart et al. | 73/1 |
| 5,539,213 | 7/1996 | Meeks et al. | 250/559.23 |
| 5,567,484 | 10/1996 | Baumgart et al. | 427/555 |
| 5,595,768 | 1/1997 | Treves et al. | 425/174.4 |
| 5,658,475 | 8/1997 | Barenboim et al. | 219/121.77 |
| 5,768,076 | 6/1998 | Baumgart et al. | 360/135 |

FOREIGN PATENT DOCUMENTS

| | | | |
|---|---|---|---|
| 0174915 | 3/1986 | European Pat. Off. | 219/121.73 |
| 0652554 | 5/1995 | European Pat. Off. | |
| 207347 | 2/1984 | Germany | 219/121.77 |
| 53-73692 | 6/1978 | Japan | 219/121.77 |
| 8106630 | 4/1996 | Japan | |

OTHER PUBLICATIONS

Cohen, M.I., "Material Processing", Laser Handbook, ch. F4, p. 1635 (North–Holland Publishing Co., 1972).

Isenor, N.R., "$CO_2$ Laser–Produced Ripple Patterns on $Ni_xP_{1-x}$ Surfaces", Appl. Phys. Let., vol. 31, No. 3, P. 148 et seq. (Aug. 1, 1977).

Guosheng, Z. et al., "Growth of Spontaneous Periodic Surface Structures on Solids During Laser Illumination", Phy. Rev. B, vol. 26, No. 10, p. 5366 et seq. (Nov. 15, 1982).

Young, J.F. et al., "Laser–Induced Periodic Surface Structure. II Experiments on Ge, Si, Al, and Brass", Phys. Rev. B, vol. 27, No. 2, p. 1155 et seq. (Jan. 15, 1983).

(List continued on next page.)

*Primary Examiner*—Gregory Mills
*Attorney, Agent, or Firm*—Jonathan A. Small

[57] ABSTRACT

Formation of laser texture features simultaneously on the target surfaces of each side of magnetic recording disk is facilitated by optical and mechanical components permitting excellent balance of optical power between each target surface, excellent matching of the radial position of laser texture features between each target surface, and excellent focusing of laser beams on each target surface. Polarization of the source laser beam may be used to controllably balance and direct a single source beam into individual beam paths for each target surface. Handling, automation complexity, and manufacturing time is thereby reduced.

18 Claims, 6 Drawing Sheets

OTHER PUBLICATIONS

Herzinger, G et al., "Fundamentals of Laser Micromachining of Metals", Laser Processing and Diagnostics, Proceedings of an International Conference, University of Linz, Austria, Springer–Verlag publisher, p. 90 et seq. (1984).

Korotchenko, A.I. et al., "Formation of Annular Relief on the Surface of a Metal After Exposure to a Strong Energy Pulse", Sov. Phys./Tech. Phys., vol. 32, No. 1, p. 99 et seq. (1987).

Lu, K. et al., "Comparison of Properties of Nanocrystalline and Amorphous Ni–P Alloys", J. Appl. Phys. D, vol. 25, No. 5, p. 808 et seq. (1992).

Kumar, P.S. et al., "Effect of Phosphorous Content on the Relative Proportions of Crystalline and Amorphous Phases in Electroless NiP Deposits", J. Matl. Sci. Let. vol. 13, No. 9, p. 671 et seq. (1994).

Waseda, Y. et al., "The Structure of Molten Nickel–Phosphorus Alloys", Z. Naturfosch., vol. 32a, No. 12, p. 1506 et seq. (Dec. 1977).

Baumgart, P. et al., "A New Laser Texturing Technique for High Performance Magnetic Disc Drives", IEEE Trans. Mag., vol. 31, No. 6, p. 2946 et seq. (Nov. 1995).

Baumgart, P. et al., "Safe Landings: Laser Texturing of High–Density Magnetic Disks", Data Storage, pp. 21–27 (Mar. 1996).

Kuo et al., "A New Texture Paradigm—Laser Zone Texture For Low Glide and Low Stiction Media", IDEMA Insight on Pseudo–Contact Recording II, vol. IX, No. 4, pp. 8–11 (Jul./Aug. 1996).

Kozu et al., "Tribological Behaviour of Rigid Disks with High Density Micro Cone–Shaped Projections", 1996 Digests of INTERMAG '96, p. HA–05 (1996).

LASER DISK TEXTURING APPARATUS

This application is a continuation of application Ser. No. 08/654,452, filed May 28, 1996, now abandoned.

The present invention relates to the field of magnetic disk manufacturing, and more particularly to an apparatus for creating a desired surface texture on selected regions of a magnetic recording disk.

Methods and apparatus for creating texture features on the surface of magnetic recording disks using laser energy are known. See, for example, U.S. Pat. Nos. 5,062,021 and 5,108,781 to Ranjan et al., published European Patent Application number 94308034.1, and Baumgart et al. "A New Laser Texturing Technique for High Performance Magnetic Disk Drives," IEEE Trans. Mag., vol. 31, no. 6, p. 2946 (November 1995). The roughness imparted by the texture features reduces the tendency of a magnetic transducer (i.e., read/write head) to adhere to the disk surface during disk rotation start-up (this tendency is referred to as stiction).

As is known from these references, the output beam of a pulsed laser is focused onto the surface of one layer of a magnetic disk with sufficient intensity to locally melt a portion of that layer and/or sublayers. When the laser power is sufficiently attenuated, the melted region resolidifies, leaving a geometric variation (referred to herein as a laser texture feature) on the surface of the targeted layer or sublayers. The physical characteristics of the laser texture feature is a function of laser pulse width, spot size, spot shape, and spot energy.

A magnetic disk having variation in its surface topography formed by laser melting and resolidification is referred to herein as a laser textured disk. As well known, in certain applications a magnetic disk having a smooth, specular surface is preferred to permit a transducer to ride as close to the disk surface as possible. Therefore, particular attention has been paid to processes for forming texture features in a special landing or contact-start-stop ("CSS") zone of the disk, for example as taught by Sugiyama in published Japanese patent application number 4-139621. A disk having such a special CSS zone formed by laser texture features is referred to herein as a laser zone textured ("LZT") disk.

FIG. 1 is a schematic illustration of a prior art apparatus 10 for creating laser texture features in a layer of a magnetic recording disk. Apparatus 10 consists of a laser 12, for example a Q-switched (pulsed) YAG laser, producing a coherent laser beam 14, which is directed toward focusing optics (lens or a combination of lenses) 16.

Typically, texturing is performed on a layer of material, such as nickel phosphorous (NiP), plated onto an aluminum alloy disk blank. The plated layer and blank are usually collectively referred to as a substrate. In the prior art apparatus shown in FIG. 1, substrate 18 is retained in a mandrel 20. Laser beam 14 is focused by focusing optics 16 to a spot on a target surface 22 of substrate 18. Target surface 22 is most commonly the outer surface of the plated layer (although it may alternatively be a surface of the blank itself, or some other layer formed above the blank).

Motor 24 causes substrate 18 to rotate, so that as the laser 12 is pulsed, each pulse of beam 14 may be made incident on a different circumferential region of target surface 22. In addition to rotation, substrate 18 is translated in the plane of the substrate 18, for example by motion control 26, so that the radial location of incidence of laser beam 14 on target surface 24 may be varied.

This process for texturing substrate 18 proceeds for each disk one side at a time. As texturing of one side of a disk is completed, that disk is removed from the mandrel, turned over, reinstalled on the mandrel, then texturing proceeds on the second side.

Texturing disks one side at a time leads to numerous problems. First, when processing one side at a time, set up and texturing time are at least double that required if both sides of a disk could be textured simultaneously.

Second, aligning the features on each side of the disk so that the transition point between the textured CSS zone and the smooth data zone are at the same radial location is difficult. The area of the CSS zone is generally minimized so that the area of the data zone is maximized. Since the transducers for each side of the disk generally move in tandem, the CSS zones for each side of the disk must be well aligned to provide the desired effects of a CSS zone.

Third, development and implementation of disk handling automation for the added step of turning a disk from one side to its other side on the mandrel adds cost and complexity not necessary if both sides of a disk could be textured simultaneously.

It is a goal of the present invention to address each of these problems and others by providing an apparatus for simultaneously texturing both sides of a disk.

SUMMARY OF THE INVENTION

The present invention is an apparatus for simultaneously creating laser texture features on both sides of a magnetic recording disk. The apparatus employs a single laser source, and appropriate measures are afforded to: provide balanced optical power to each side of the disk; provide excellent focusing of the beam on each side of the disk; and provide excellent alignment of the boundaries between the CSS zone and data zone as between the two sides of the disk.

According to one embodiment of the present invention, the laser energy is focused onto the surface of the plated NiP layer, and the laser texture features are formed in this layer. The features may form concentric tracks, spirals, or bands of randomly placed features in zones or over the entire substrate. Subsequent to forming the laser texture features, additional layers such as layers of magnetic material and layers of protective material are deposited. These subsequent layers, deposited on the layer having the laser texture features, carry forward the laser texture features so that the finished multi-layered magnetic disk has approximately those same laser texture features (e.g., shape, depth/height, density, etc.) in its outermost layer.

It will be appreciated by one skilled in the art that it is within the spirit and scope of the present invention that the texture features may be formed in another one of the layers comprising the completed disk, including in the blank itself. In addition, the blank may be formed of a material other than aluminum, with a layer formed on the blank for receiving laser texture features as appropriate. Importantly, the outermost layer must present the texture features to the transducer to provide the necessary reduction in stiction.

One exemplary embodiment of the present invention comprises:

a body configured to define: a cavity, beam paths for beams B, B1, and B2, and a disk receiving region;

a window in a first side of the body;

a polarization rotator for rotating the polarization of light incident thereon, positioned within the cavity and in the path of beam B;

a beam splitter for splitting beam B into two beams, B1 and B2;

a first mirror positioned within the cavity for directing the path of beam B1 towards a first surface of a disk substrate located in the disk receiving region;

a first lens for focusing beam B1 onto the first surface of the disk substrate;

second and third mirrors positioned within the cavity, the second mirror for directing beam B2 towards the third mirror, the third mirror for directing beam B2 towards a second surface of the disk substrate located in the disk receiving region; and a second lens for focusing beam B2 onto the second surface of the disk substrate.

Various of the components of the apparatus are repositionable so that beams B1 and B2 may be aligned and properly focused and balanced on the first and second surfaces of the substrate, respectively.

In addition, one or more techniques may be employed to reduce feedback of the laser beam into the laser cavity and thereby improve the uniformity of the height of the laser texture features. For example, the laser beam may be made to pass off-center through a lens and through an iris such that any reflected beam is blocked by the iris. This method is generally described in copending U.S. patent application Ser. No. 08/552,185, which is incorporated by reference herein. Alternatively, beams B1 and B2 may be made to impinge upon the first and second surfaces at an angle such that any reflection of the beams by the surfaces is angled to miss the lenses through which the beams originally pass. One way to accomplish this is to tilt the apparatus relative to the plane of the disk to be textured. Another way to accomplish this same result is to arrange the mirrors within the cavity such that beams exit the apparatus at the desired angle.

The invention will be more precisely described and understood by reference to the following detailed description and the various embodiments described therein.

BRIEF DESCRIPTION OF THE DRAWINGS

With regard to the following description.

As between each of these figures, like reference numerals shall denote like elements.

DETAILED DESCRIPTION

For purposes of illustration, the present invention will be described by way of selected embodiments. It will be apparent to one skilled in the art that the embodiments, and the environment in which they are developed, demonstrate the functionality and features of the present invention. It will also be apparent that certain variations, additions, deletions, modifications, etc., to the embodiments, although not specifically discussed herein, are contemplated and within the scope of one skilled in the art given the present disclosure. Therefore, recitation of embodiments is not intended as, nor should be read as, limiting the scope of the invention claimed herein.

Figure 2:
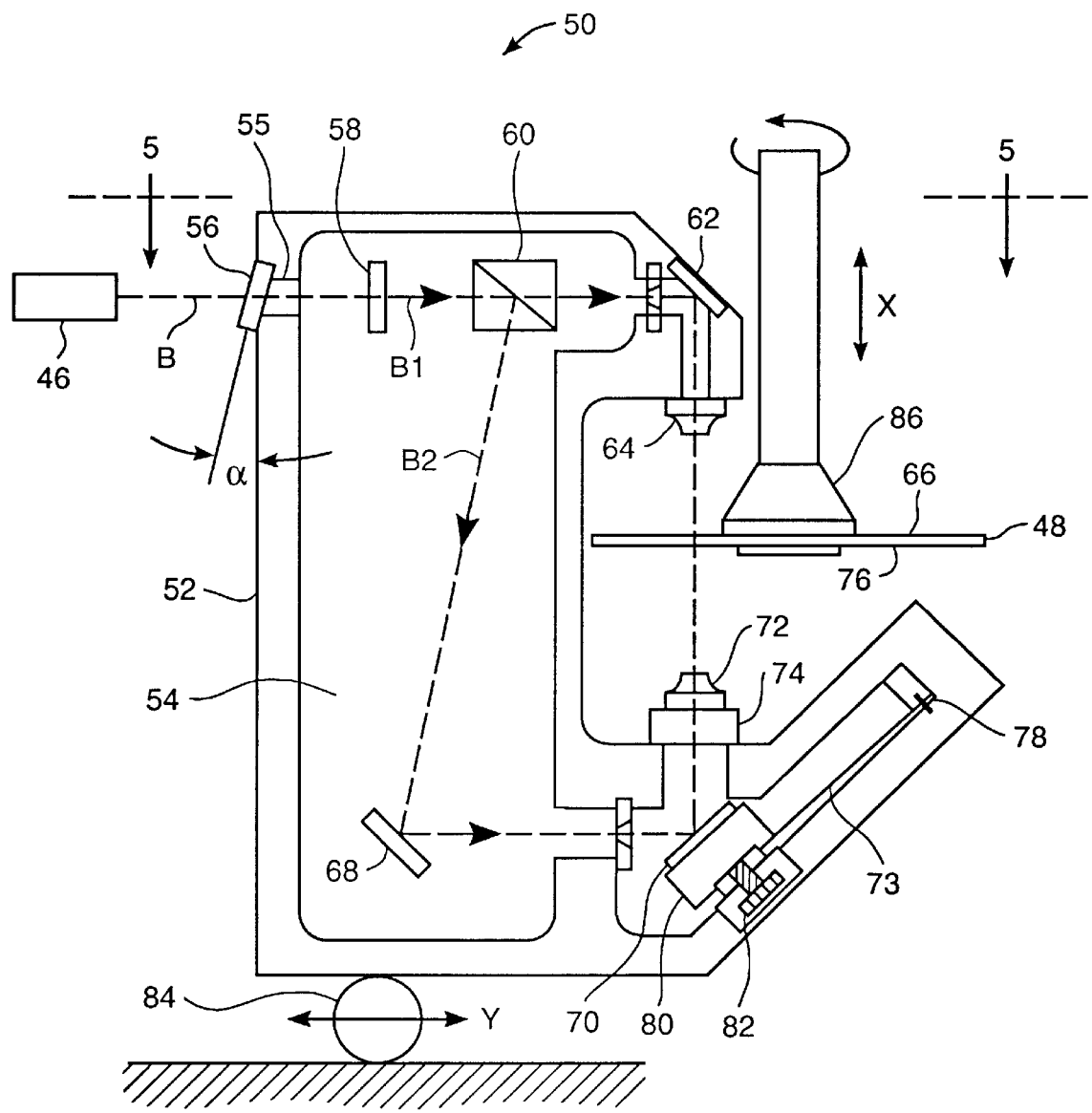
FIG. 2 is a schematic illustration of an apparatus for producing laser texture features in magnetic hard disk substrate according to one embodiment of the present invention.

FIG. 2 shows a cut-away view of one embodiment of the present invention, which is designed to simultaneously impart laser texture features to both sides of a magnetic disk. Initially, the structural composition of an apparatus 50 representing a first embodiment of the present invention shall be described, followed by a description of the alignment and operation thereof.

Apparatus 50 comprises a body 52 configured to define cavity 54 for retaining therein certain optical components. Body 52 also has defined in a first side thereof an opening 55 sized and positioned to receive a window 56. Window 56 is sized and positioned to transmit a laser beam B generated by an external laser 46. Laser 46 may typically be a Q-switched YLF laser, such as model 7960-L4-E (2000 mW, Nd:YLF), manufactured by Spectra-Physics Lasers, Inc. of Mountain View, Calif., or other pulsed laser (e.g., YAG, etc.) with appropriate capabilities to cause formation of a texture feature in a target substrate. The laser beam B emitted by laser 46 will be collimated, and linearly polarized by an external polarizer (not shown) as well known in the art. Window 56 will typically be optically transparent glass, for example in the range of 1 or more millimeters thick. For reasons discussed further below, window 56 will typically be tilted off from perpendicular to the path of beam B by an angle $\alpha$.

Disposed first in the path of beam B within cavity 54 is a polarization rotator 58 (i.e., a half-wave plate) of a type well known in the art, and available, for example from CVI Laser, Livermore, Calif. Rotation of polarization rotator 58 results in rotation of the polarization of beam B. Disposed next in the path of beam B is polarizing beam splitter 60 for splitting beam B into first and second collimated beams, B1 and B2 respectively, as a function of rotation of the polarization of beam B. Beam splitter 60 is of a type well known in the art, and available, for example from CVI Laser, Livermore, Calif. Beams B1 and B2 ultimately are the beams which form the laser texture features in first and second sides of the substrate, respectively.

Following the path of beam B1, that beam exits the beam splitter 60 in a direction parallel to the path of beam B. Beam B1 is first incident on mirror 62 (all mirrors described herein may be front surface mirrors, or back surface mirrors with antireflection coating, of adequate optical quality, as may be appropriate), which directs beam B1 in a direction roughly perpendicular to the path of beam B. Beam B1 is then passed through a lens 64, which is used to focus beam B1 on the target surface 66 on the first side of the substrate 48, as described further below.

Following the path of beam B2, that beam exits beam splitter 60 in a direction roughly perpendicular to the path of beam B. Beam B2 is first incident on mirror 68, which directs beam B2 in a direction roughly parallel to the path of beam B toward mirror 70. Mirror 70 next directs beam B2 in a direction roughly perpendicular to the path of beam B. Beam B2 is then passed through a lens 72, mounted in an adjustable focusing mount 74 which is used to focus beam B2 on the target surface 76 on the second side of the substrate 48, as described further below. Adjustable focusing mount 74 typically will be a threaded mount for moving lens 72 in a direction parallel to the path of beam B2.

Mirror 70 is mounted on an adjustable mount comprising connecting arm 73 having an anchored first end 78 and free second end 80. Free second end 80 rotates around the anchored first end 78 in response to actuation of a barrel adjustment screw 82. The purpose of this adjustment mechanism will be described in further detail below.

The entirety of apparatus 50 moves under the control of motion control 84 in a direction highly parallel to the plane of substrate 48, to facilitate formation of a CSS zone by varying the radial position of incidence of beams B1 and B2 on target surfaces 66 and 76. Motion control 84 also, in certain applications, facilitates installation and removal of substrate 48 onto and off of mandrel 86, for example by a human operator or by suitable robotics. Motion control 84 may be a combination of motor, gear, and track, or similar mechanical device.

Figure 3:
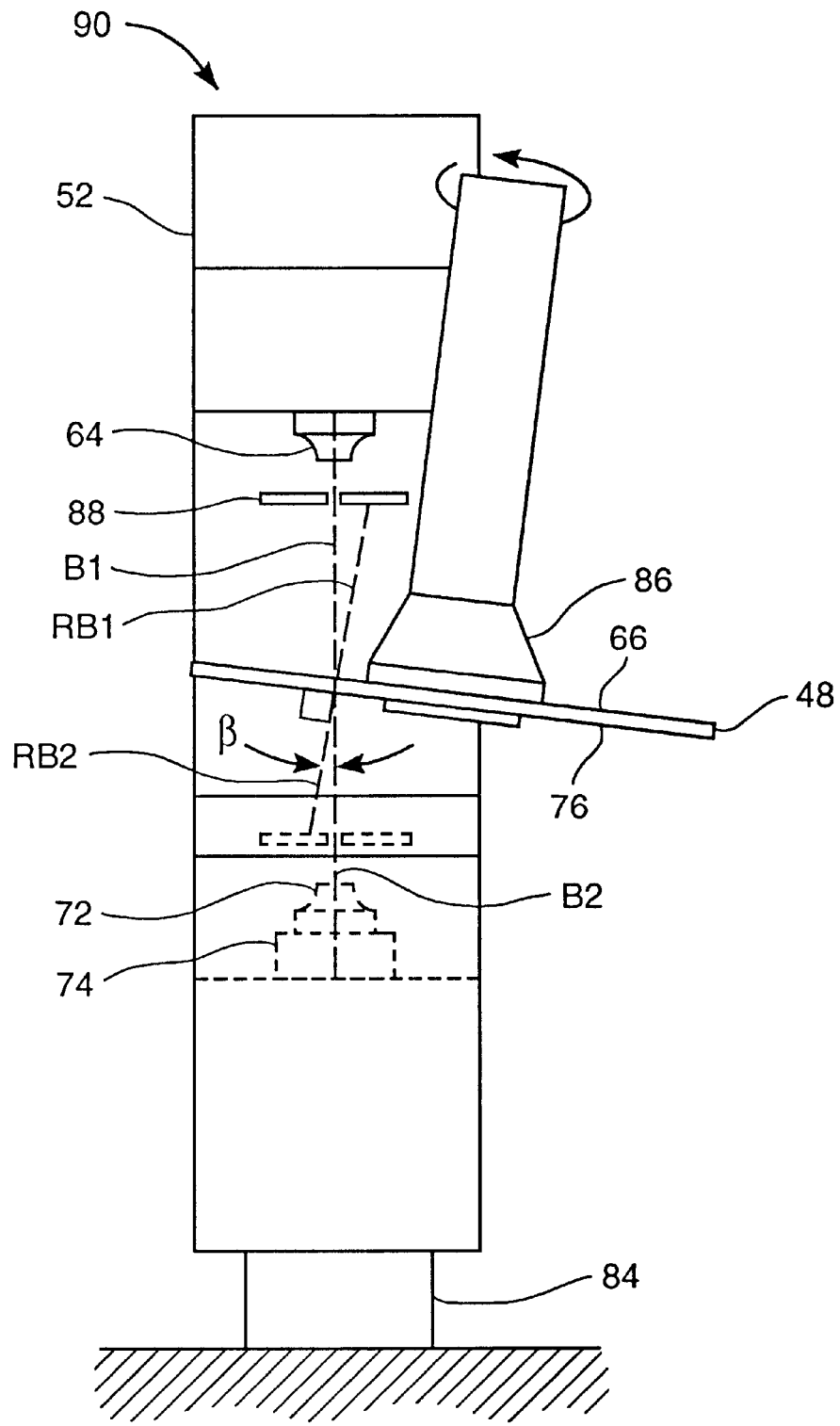
FIG. 3 is a schematic illustration of an apparatus for producing laser texture features in magnetic hard disk substrate according to another embodiment of the present invention.

FIG. 3 shows, in front view, another embodiment 90, which is a variation of the embodiment shown in FIG. 2. As shown, substrate 48 and mandrel 86 are inclined such that the plane of substrate 48 is at an angle β from perpendicular to beams B1 and B2. The angle β is chosen so as to reduce the effective feedback of beams B1 and B2 back into the cavity of laser 46, as described in applicant's copending patent application Ser. No. 08/552,185, incorporated herein by reference. Likewise, window 56 may be tilted off from perpendicular to the path of beam B by an angle α to reduce feedback of the laser beam into the laser cavity. An alternative or addition to inclining substrate 48 to provide feedback reduction is to introduce blocking means 88 (such as an iris or aperture plate) for blocking the reflected beams (e.g., beam RB1), as described in applicant's aforementioned patent application Ser. No. 8/552,185. Beams B1 and B2 may further be offset from the center of their respective lenses 64 and 72 should the iris or blocking plate be disposed within cavity 54, also as taught by the aforementioned patent application.

Figure 4:
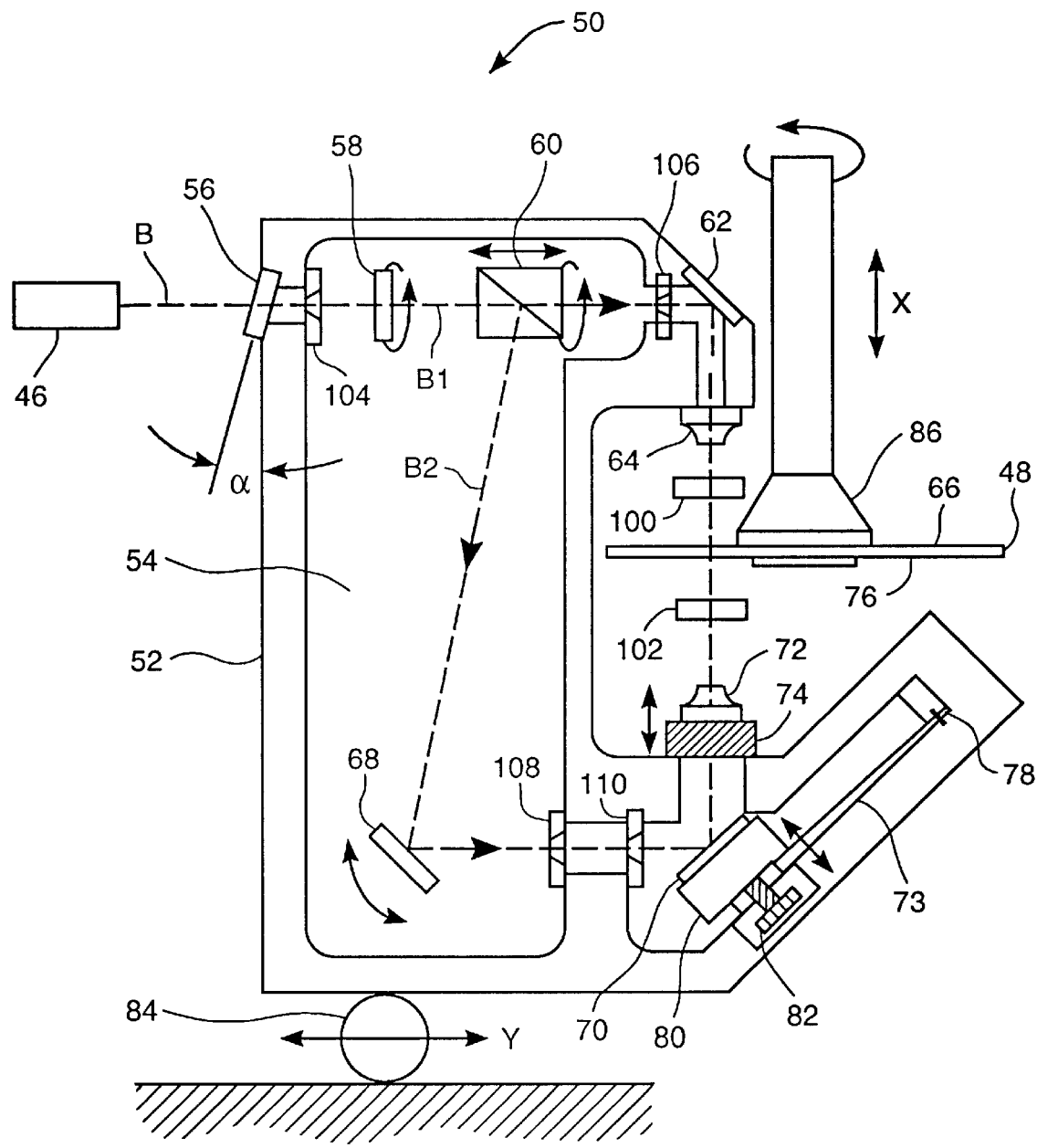
FIG. 4 is a schematic illustration of an apparatus for producing laser texture features in magnetic hard disk substrate according to the embodiment shown in FIG. 2, with those components installed necessary for alignment, balance, and focusing of said embodiment.

Operation of apparatus 50 to simultaneously produce laser texture features in CSS zones on two sides of a magnetic disk substrate begins with alignment of the various components of apparatus 50. Proper alignment enables excellent balance of optical power between the two sides of the substrate, excellent focus of the beams on the two sides of the substrate, and excellent alignment of the CSS zone boundaries between the two sides of the substrate. Alignment proceeds with certain additional elements in place in apparatus 50 as shown in FIG. 4. Namely, photodetectors 100 and 102 are placed in line with beams B1 and B2. Photodetectors 100 and 102 are of a type well known in the art, for example model FFD-200, available from EG&G, Vaudrevil, Quebec, Canada, and are used to detect beam power during the alignment process. Four apertures 104, 106, 108 and 110 are also located in apparatus 50.

First, beam B is boresight aligned through apertures 104 and 106. That is, beam B is moved appropriately until the maximum power is detected by photodetector 100, meaning that the beam is centered in the openings of apertures 104 and 106. Typically, this is done by adjusting the position of an external routing mirror (not shown). In this way, the position of beam B1 is established, for example centered on lens 64. Aperture 104 may then be removed.

Next, mirror 68 is removed, and a target T (not shown) is put in its place. Typically, the target will be a cross-hair target. Polarizing beam splitter 60 is then manually translated in the plane of beam B such that beam B2 aligns with the cross-hairs of target T, verified visually with an IR viewer. Target T is then removed and mirror 68 returned to place.

Aperture 108 is in the form of a circular opening, and aperture 110 is first in the form of a slit (with a long direction extending roughly parallel to the plane of substrate 48). Mirror 68 is manually tilted using a precision screw with spring return relative to the path of beam B2 to boresight align beam B2 through apertures 108 and 110. That is, mirror 68 is tilted until maximum power is detected by photodetector 102. Aperture 108 is then removed, and aperture 110 replaced to be in the form of a circular opening. Polarizing beam splitter 60 is then rotated around an axis roughly parallel to the path of beam B such that beam B2 passes through aperture 110, as determined by the optical power detected by photodetector 102. In this way, beam B2 is aligned so as to be incident on the center of lens 72.

Next, the optical power is balanced between paths B1 and B2. This is accomplished by rotating polarization rotator 58 around an axis roughly parallel to the path of beam B. This rotation of the polarization of beam B varies the ratio of the intensity of transmitted beam B1 to reflected beam B2 by polarizing beam splitter 60. Polarization rotator 58 is rotated until the same optical power is detected by each of photodetectors 100 and 102, indicating the desired balance between beams B1 and B2. In those applications where it is desirable to have different beam intensities on the two surfaces, this result may simply be accomplished by appropriate adjustment of polarization rotator 58, as determined by detectors 100 and 102.

Next, beams B1 and B2 are focused. Each of lenses 64 and 72 are typically objective lenses, with a typical focal length of 25 mm, although other lenses and focal lengths will serve an equivalent purpose. Initially, a focus series is made on a sample disk to find the focus of lens 64 on target surface 66. A series of laser texture features is formed on a sample disk, for example by forming bands of features, with each band representing a different distance between lens 64 and target surface 66, by varying the relative distance between lens 64 and target surface 66 in the x-direction. Either the mandrel 86 or apparatus 50 may be moved to accomplish this positioning. By examining the laser texture features so formed, it is possible to visually determine the preferred distance, referred to as d1, between lens 64 and target surface 66 (corresponding to proper focus for lens 64).

At this point, the precise position that beam B1 is incident on target surface 66 at the smallest radial distance from the center of the disk is determined. This position is used as the reference position for aligning beams B1 and B2.

Figure 7A:
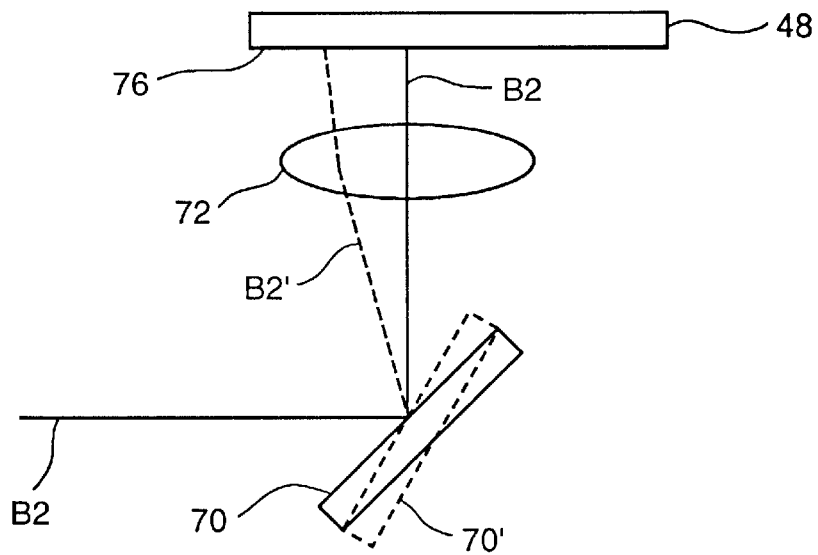
FIGS. 7A and 7B are illustrations of the optics of adjustment of a mirror without and with accounting for movement of the beam on the lens surface, respectively.
Figure 7B:
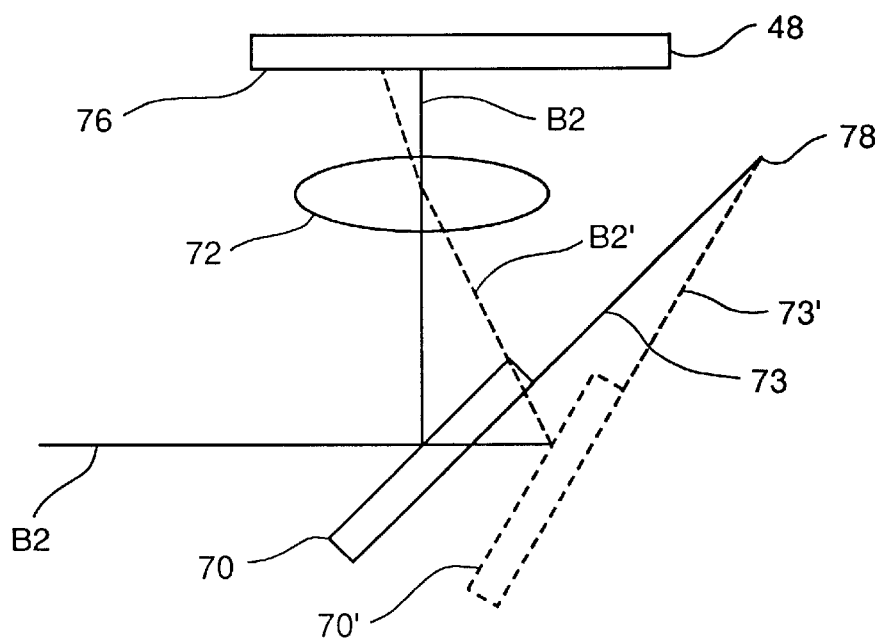

The reference position for target surface 66 is fixed by the position of beam B1. The position that beam B2 is incident on target surface 76 may be varied by varying the angle at which beam B2 is incident on lens 72. This may be accomplished by varying the angle of mirror 70. Beam B2 has previously been aligned so that it is incident roughly in the center of lens 72. In order to reduce optical effects, such as aberration, resulting from varying the point of incidence of beam B2 from the center of lens 72, mirror 70 is mounted on connecting arm 73. Mirror 70 is mounted opposite anchored first end 78 such that mirror 70 rotates around the anchored first end 78 in response to actuation of barrel adjustment screw 82. Absent such device, adjustment for beam position (i.e., rotating mirror 70 around its center) results in a change in position of incidence of beam B2 on lens 72, as shown in FIG. 7A (B2' is the path of beam B2 upon rotating mirror 70, 70' is the position of mirror 70 after rotation). However, employing this device, the position of incidence of beam B2 on lens 72 remains unchanged while the angle of incidence of beam B2 on lens 72 varies—the position at which beam B2 is incident on target surface 76 may be varied to match the reference position of target surface 66, while the position at which beam B2 is incident on lens 70 remains the unchanged, as shown in FIG. 7B.

It should be appreciated that the method of positioning beams B1 and B2 on their respective target surfaces 66 and 76 may take many forms, and the above description is just one example of such a method. For example, each of beams B1 and B2 may be provided with independent position control, as opposed to fixing one beam path and accommodating the second beam path for alignment.

Finally, if lenses 64 and 72 are of the same focal length, the distance d2 between lens 72 and target surface 76 is known from the focus series determined previously, it is equal to d1. This distance may be set, and fine adjustment may be made to accommodate for slight difference between the focal lengths of lenses 64 and 72, by adjustable focusing mount 74.

Alternatively, a second focus series may be made to determine the optimal distance between lens 72 and target surface 76 in a manner similar to that described above. This distance is referred to as d2. The distance d1 between lens 64 and target surface 66 is then set, and adjustable focusing mount 74 is adjusted so that the distance d2 is obtained between lens 72 and target surface 76.

With the alignment and focus of the components of apparatus 50 completed, apertures 106 and 110 may be removed (apertures 104 and 108 being previously removed). Apparatus 50 is then enclosed, generally by applying covers (not shown) to all openings therein, with the exception of window 56 and lenses 64 and 72. In this way, the introduction of contaminants into the interior of apparatus 50 is minimized, as is the risk of accidental jarring or disruption of the components of apparatus 50, either of which might affect alignment and/or focus of the optics of apparatus 50.

Operation of apparatus 50 to simultaneously produce laser texture features in CSS zones on two sides of a magnetic disk substrate proceeds as follows. With reference again to FIGS. 2 and 3, apparatus 50 is initially in a position to allow free and clear installation of disk substrate 48 onto mandrel 86, either by a human operator or adequate robotics, as may be appropriate. With substrate 48 located on mandrel 86, apparatus 50 is moved by motion control 84 into a position such that beams B1 and B2 will be incident on the target surfaces 66 and 76, respectively, at a position corresponding to the position of the inside diameter of the CSS zone for each target surface.

Beam B, in the form of pulses of optical energy, is generated by laser 46 and introduced into apparatus 50, where it is split into beams B1 and B2, which are directed to the target surfaces 66 and 76, respectively. The intensity of each pulse of optical energy is sufficient to locally melt the target surface. The rotation of the substrate by mandrel 86 is coordinated with the duration of the pulse of beam B such that the plan view of each feature is roughly circular, or slightly elongated, with a selected profile (e.g., crater, sombrero, etc.)

The pulse width of beam B and rotation of mandrel 86 is coordinated with translation of apparatus 50 by motion control 84 to produce bands of laser texture features on the target surfaces. For example, formation of laser texture features begins at the inside diameter of the CSS zone of each target surface. Motion control 84 moves apparatus 50 in the y-direction, parallel to the plane of substrate 48 so as to maintain the set alignment and focus of beams B1 and B2, radially away from the center of the substrate while beams B1 and B2 are pulsed on their respective target surfaces. The motion of apparatus 50 may be either in steps, which results in the formation of concentric bands of laser texture features, or continuous, which results in a continuous spiral of laser texture features. Apparatus 50 is moved by motion control 84 from a position corresponding to the formation of laser texture features at the inside diameter of the CSS zone to a position corresponding to the formation of laser texture feature at the outermost diameter of the CSS zone, forming laser texture features along the way.

As an alternative to motion control 84 moving apparatus 50, mandrel 86 may be provided with appropriate motion control (not shown) such that, in addition to rotating substrate 48, it also translates substrate 48 relative to the paths of beams B1 and B2 so as to form CSS zones in the target surfaces. Yet another alternative to employ electro-optical or accousto-optical components (not shown) capable of scanning beams B1 and B2 radially across the target surfaces while rotating substrate 48. Importantly, it should be appreciated that the present invention is not limited to one mode or another or scanning beams B1 and B2 across the target surfaces.

Figure 1:
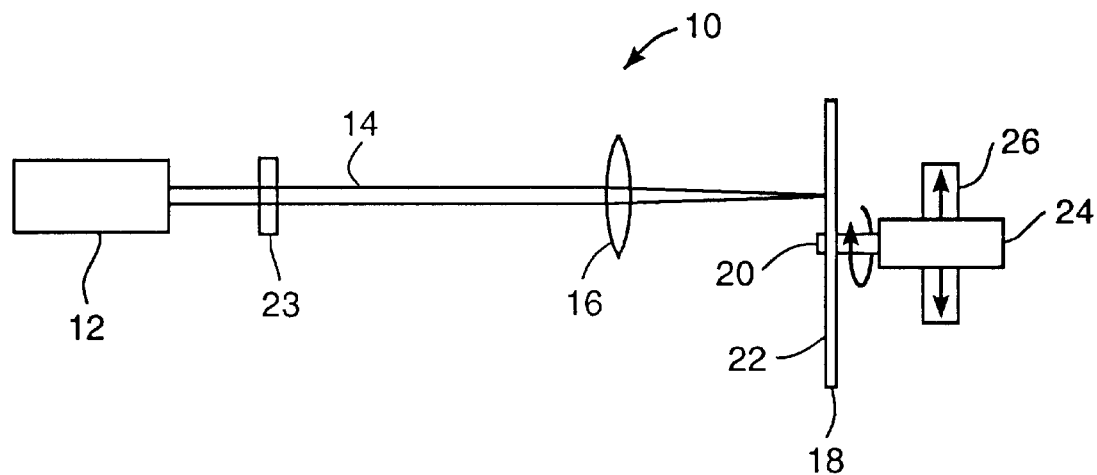
FIG. 1 is a schematic illustration of an apparatus for producing laser texture features in magnetic hard disk substrate of the type known in the art.
Figure 5:
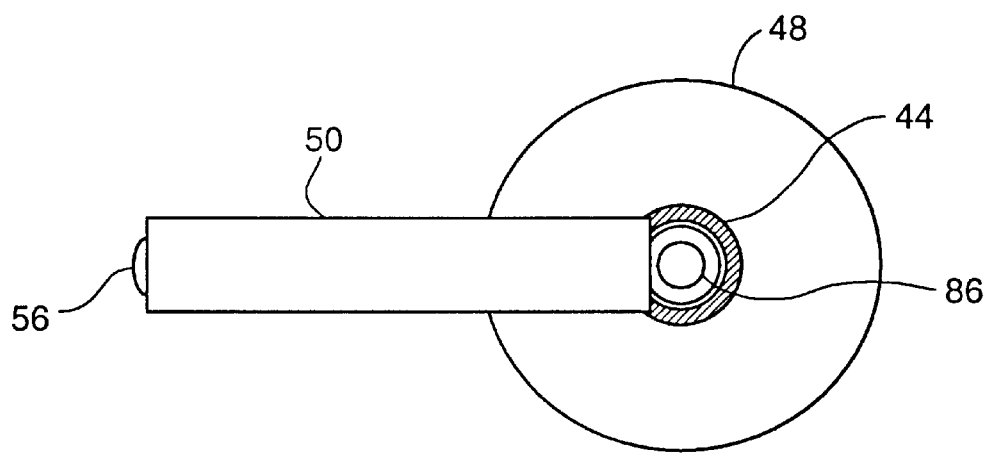
FIG. 5 is a top view of one embodiment of the present invention, including a magnetic recording disk substrate after formation of a CSS zone of laser texture features thereby.

FIG. 5 shows apparatus 50 from a top view perspective, after formation of a CSS zone 44 comprised of laser texture features. At this point, textured substrate 48 may be removed from mandrel 86, and further steps of forming of a completed magnetic storage disk, such as cleaning the textured substrate, depositing layers of magnetic recording material and protective overcoating material, etc., may be completed.

Figure 6:
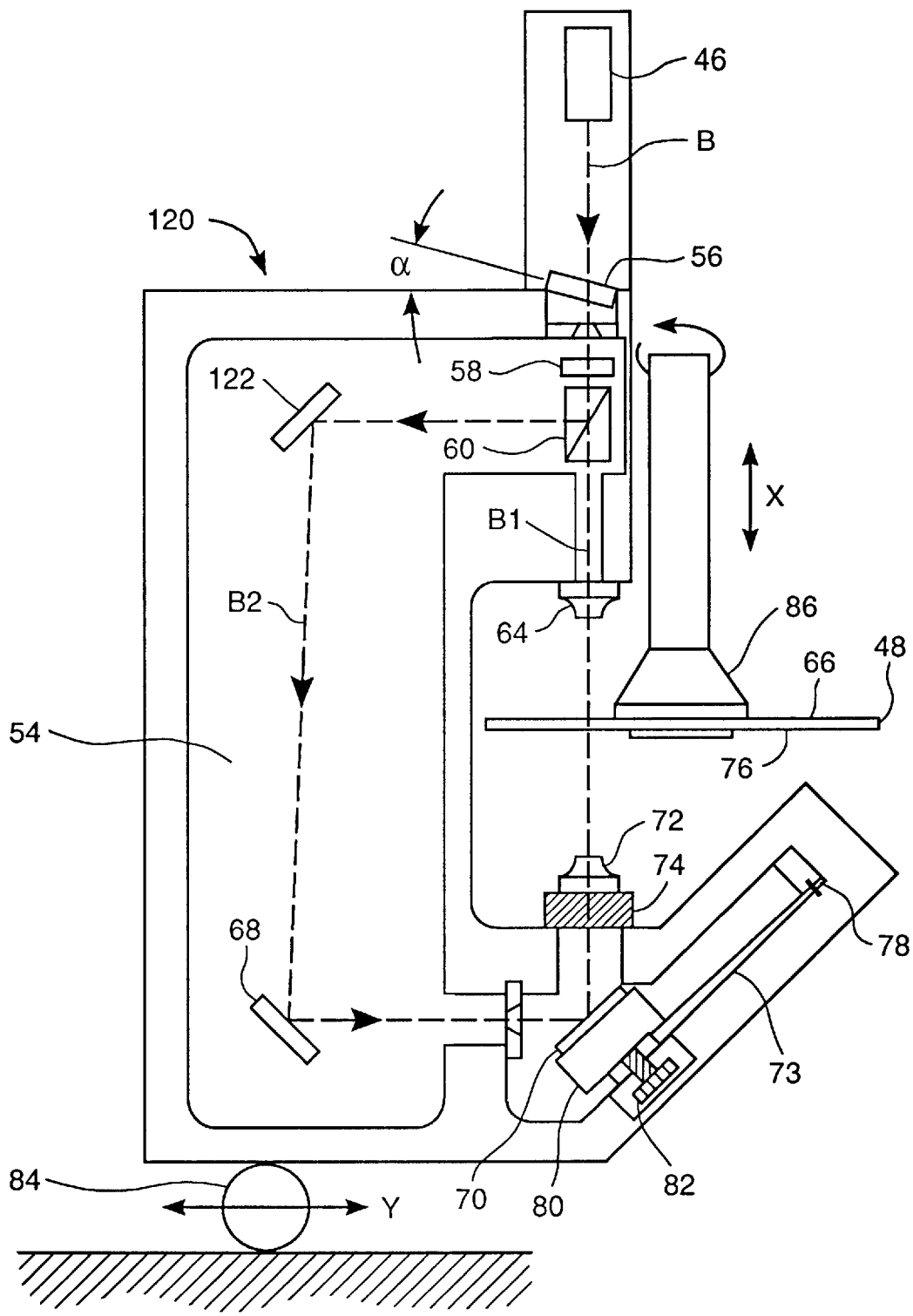
FIG. 6 is a schematic illustration of an apparatus for producing laser texture features in magnetic hard disk substrate according to yet another embodiment of the present invention.

An example of an alternate embodiment 120 of the present invention is shown in FIG. 6. Embodiment 120 differs from that shown in the prior embodiments in that the path of beam B is parallel to the path of beam B1. The addition of mirror 122 permits the path of beam B2 to be directed towards target surface 76. Laser 46, in this embodiment must be secured to body 50, or appropriate optics must be introduced in the path of beam B, so that motion of body 52 under control of motion control 84 does not affect the focus or alignment of beams B1 and B2. Additional and/or different steps in the alignment and focus procedures from those previously described would be necessitated by the modification to the prior described apparatus' geometry, which will be within the scope of the skills of one familiar with the arts to which this invention relates. In fact, many such variations in the geometry of the present invention are conceivable and within the scope of the skills of one familiar with the arts to which this invention relates given the present disclosure.

In fact, to those skilled in the art to which this invention relates, many changes in construction and widely differing embodiments and applications of the present invention will suggest themselves without departing from its spirit and scope. For example, the present invention has been described from the perspective of forming laser texture features in metal layers. However, there are numerous disclosures in the art relating to the formation of laser texture features in nonmetallic materials, such as glass, or metal layers deposited on nonmetallic substrates, which would benefit from the teachings of the present invention.

Furthermore, a Q-switched laser has exemplified the radiation source used to form the texture features. However, other means for modulation of the optical energy source may be employed with the present invention. In addition, other components may be used with apparatus 50, such as optical power monitors, shutters, and other external components to align and control beam B, as will be appreciated by one skilled in the art.

As well, if a single laser source is employed, that source must generate a beam of sufficient energy such that upon being split into two beams, each beam has sufficient energy to form laser texture features. However, the beams of two individual lasers, each with power sufficient to form laser texture features in one target surface, but alone insufficient to be split into two beams capable of forming laser texture features, may be employed to simultaneously texture the two target surfaces of a substrate. In such a case, the two individual beams should have similar pulse rates, but need not necessarily have synchronized pulse trains. In fact, the beams of two lasers, each with insufficient power alone to be split into two beams capable of forming laser texture features, but whose pulses are in phase may be combined to obtain a single beam of sufficient energy that, when split, can produce two beams of sufficient energy to form laser texture features. Thus, the disclosures and descriptions herein are illustrative, and are not intended and should not be read to be in any sense limiting.

What is claimed is:

1. An apparatus for simultaneously forming texture features on two target surfaces, such target surfaces being located on opposite sides of a generally planar disk substrate of a magnetic recording disk, each such feature formed by the incidence of a laser beam upon the target surface, comprising;

a body having a cavity for receiving first, second and third laser beams, each said laser beam having a path which is in part contained with said body, said cavity further defining a disk receiving region;

a laser located external to said cavity, said laser producing said first laser beam;

an optically transparent window located in said body and in the path of said first laser beam for transmitting said first laser beam from said laser, located external to sad cavity, to within said cavity;

a beam splitter, located within said cavity and between said window and said disk receiving region, for selectively splitting said first laser beam into said second and third laser beams;

first and second lenses, each disposed within said body, and in the path of said second and third laser beams, respectively, for selectively focusing said second and third laser beams upon said first and second target surface, respectively, of said disk substrate located in said disk receiving region;

a plurality of mirrors, disposed within said body, in the path of said second and third laser beams, for respectively directing said second and third laser beams toward said first and second target surfaces; and a disk retaining mandrel capable of holding said generally planar disk substrate of a magnetic recording disk such that said second beam and said third beam are incident upon said first and second target surfaces aligned in a determined zone of each of said first and second target surfaces;

wherein said laser is mounted such that motion of said body relative to said laser does not affect the focus of said second and said third laser beams on said first and said second targets respectively.

2. The apparatus of claim 1, wherein said disk retaining mandrel is further capable of rotating said disk substrate retained thereby such that said second and third laser beams may be caused to impact said disk substrate entirely around a circumference of said disk substrate.

3. The apparatus of claim 2, further comprising means causing relative motion between said body and said disk substrate retained by said mandrel such that said motion effects scanning of said second and third laser beams in a direction parallel to a radius of said disk substrate.

4. The apparatus of claim 3, wherein said means for causing relative motion is a motion control apparatus capable of moving said body.

5. The apparatus of claim 2, wherein said mandrel retains said disk substrate at an angle relative to the paths of said second and third laser beams such that any reflection of said second and third laser beams from said first or second target surfaces is directed at an angle relative to the paths of said second and third laser beams sufficient to avoid such reflection being incident upon either of said first or second lenses.

6. The apparatus of claim 1, wherein said window is inclined such that any reflection of said first laser beam therefrom in the direction of a source of such first laser beam is inclined at an angle relative to the path of said first laser beam sufficient to avoid interference with said source of said first laser beam.

7. The apparatus of claim 1, further comprising a blocking apparatus disposed such that a beam reflected in the direction of a source of the first laser beam, comprising any part of the first, second or third laser beams reflected by said first or second target surfaces, or said window, is blocked from entering said source of the first laser beam thereby.

8. An apparatus for simultaneously forming texture features on two target surfaces, such target surfaces being located on opposite sides of a generally planar disk substrate of a magnetic recording disk, each such feature formed by the incidence of a laser beam upon the target surface, comprising:

a body having a cavity defining a beam path for a first laser beam, a beam path for a second laser beam, and a beam path for a third laser beam, and further defining a disk receiving region;

a disk substrate of a magnetic recording disk located in said disk receiving region, said disk substrate having a first and second target surface;

a laser source located external to said cavity, said laser source producing said first laser beam;

an optically transparent window located in said body and in a path of said first laser beam for transmitting said first laser beam from said laser source external to said cavity to within said cavity;

a polarization rotator, disposed within said body, in the path of said first laser beam, and located between said optically transparent window and said disk receiving region, for selectively rotating the polarization of said first laser beam;

a polarizing beam splitter, disposed within said body, in the path of said first laser beam, and located between said polarization rotator and said disk receiving region, for selectively splitting said first laser beam into second and third beams of collimated optical energy, the ratio of optical energy forming said second and third beams of collimated optical energy being a function of the degree of rotation of polarization of said first laser beam;

a first lens, disposed within said body, in the pat of said second laser beam, and located between said polarizing beam splitter and said disk receiving region, for transmitting said second laser beam from within said cavity to without said cavity, and for selectively focusing said second laser beam upon said first target surface of said disk substrate located in said disk receiving region;

a second lens, focusable by means of an associated adjustable focusing mount, disposed within said body, in the path of said third laser beam, and located between said polarizing beam splitter and said disk receiving region, for transmitting said third laser beam from within said cavity to without said cavity, and for selectively focusing said third laser beam upon said second target surface of said disk substrate located in said disk receiving region; and a plurality of mirrors, disposed within said body, in the path of said third laser beam, and located between said polarizing beam splitter and said second lens, for directing said third laser beam toward said second target surface of said disk substrate, each of said mirrors selectively positionable to control the path of said third laser beam;

wherein said laser is mounted such that motion of said body relative to said laser does not affect the focus of said second and said third laser beams on said first and said second target surfaces, respectively.

9. The apparatus of claim 8, further comprising a disk retaining mandrel capable of retaining said disk substrate in said disk receiving region, and further capable of rotating said disk substrate retained thereby such that said second and third laser beams may be caused to impact said disk substrate entirely around a circumference of said disk substrate.

10. The apparatus of claim 9, further comprising means causing relative motion between said body and said disk substrate retained by said mandrel such that said motion effects scanning of said second and third laser beams in a direction parallel to a radius of said disk substrate.

11. The apparatus of claim 10, wherein said means for causing relative motion is a motion control apparatus capable of moving said body.

12. An apparatus for simultaneously forming texture features on two target surfaces, such target surfaces being located on opposite sides of a generally planar disk substrate of a magnetic recording disk, each such feature formed by the incidence of a laser beam upon the target surface, comprising:

a body having a cavity defining a beam path for a first laser beam, a beam path for a second laser beam, and a beam path for a third laser beam, and further defining a disk receiving region;

a disk substrate of a magnetic recording disk located in said disk receiving region, said disk substrate having a first and second target surface;

a laser source located externally to said cavity, said laser source producing said first laser beam;

an optically transparent window located in said body and in a path of said first laser beam for transmitting said first laser beam from said laser source external to said cavity to within said cavity;

a polarization rotator, disposed within said body, in the path of said first laser beam, and located between said optically transparent window and said disk receiving region, for selectively rotating the polarization of said first laser beam;

a polarizing beam splitter, disposed within said body, in the path of said first laser beam, and located between said polarization rotator and said disk receiving region, for selectively splitting said first laser beam into second and third beams of collimated optical energy, the ratio of optical energy forming said second and third beams of collimated optical energy being a function of the degree of rotation of polarization of said first laser beam;

a first lens, disposed within said body, in the path of said second laser beam, and located between said polarizing beam splitter and said disk receiving region, for transmitting said second laser beam from within said cavity to without said cavity, and for selectively focusing said second laser beam upon said first target surface of said disk substrate located in said disk receiving region;

a first mirror, disposed within said body, in the path of said second laser beam, and located between said polarizing beam splitter and said first lens, for directing said second laser beam toward said first target surface of said disk substrate;

a second lens, focusable by means of an associated adjustable focusing mount, disposed within said body, in the path of said third laser beam, and located between said polarizing beam splitter and said disk receiving region, for transmitting said third laser beam from within said cavity to without said cavity, and for selectively focusing said third laser beam upon said second target surface of said disk substrate located in said disk receiving region; and second and third mirrors, disposed within said body, in the path of said third laser beam, and located between said polarizing beam splitter and said second lens, for directing said third laser beam toward said second target surface of said disk substrate, each of said second and third mirrors selectively positionable to control the path of said third laser beam.

13. An apparatus for simultaneously forming texture features on two target surfaces, such target surfaces being located on opposite sides of a generally planar disk substrate of a magnetic recording disk, each such feature formed by the incidence of a laser beam upon the target surface, comprising:

a body having a cavity defining a beam path for a first laser beam, a beam path for a second laser beam, and a beam path for a third laser beam, and further defining a disk receiving region;

a laser source located externally to said cavity; said laser source producing said first laser beam;

an optically transparent window located in said body and in a path of said first laser beam for transmitting said first laser beam from said laser source external to said cavity to within said cavity;

a polarization rotator, disposed within said body, in the path of said first laser beam, and located between said optically transparent window and said disk receiving region, for selectively rotating the polarization of said first laser beam;

a polarizing beam splitter disposed within said body, in the path of said first laser beam, and located between said polarization rotator and said disk receiving region, for selectively splitting said first laser beam into second and third beams of collimated optical energy, the ratio of optical energy forming said second and third beams of collimated optical energy being a function of the degree of rotation of polarization of said first laser beam;

a first lens, disposed within said body, in the path of said second laser beam, and located between said polarizing beam splitter and said disk receiving region, for transmitting said second laser beam from within said cavity to without said cavity, and for selectively focusing said second laser beam upon a first target surface of a disk substrate located in said disk receiving region;

a first mirror, disposed within said body, in the path of said second laser beam, and located between said polarizing beam splitter and said first lens for directing said second laser beam toward said first target surface of said disk substrate;

a second lens, focusable by means of an associated adjustable focusing mount, disposed within said body, in the path of said third laser beam, and located between said polarizing beam splitter and said disk receiving region, for transmitting said third laser beam from within said cavity to without said cavity, and for selectively focusing said third laser beam upon a second target surface of said disk substrate located in said disk receiving region;

second and third mirrors disposed within said body, in the path of said third laser beam, and located between said polarizing beam splitter and said second lens, for directing said third laser beam toward said second target surface of said disk substrate, each of said second and third mirrors selectively positionable to control the path of said third laser beam, wherein said second mirror is disposed between said polarizing beam splitter and said third mirror, and said third mirror is disposed between said second mirror and said second lens; and means for controllably adjusting the angle of said third mirror such that the location of incidence of said third laser beam on said second target surface may be adjusted thereby and wherein such adjustment does not affect a selected position of incidence of said third laser beam upon said second lens.

14. The apparatus of claim 13, wherein said laser source, located external to said body, is mounted such that motion of said body does not affect the focus of said second and third laser beams on said first and second target surfaces, respectively.

15. The apparatus of claim 13, further comprising a disk retaining mandrel capable of retaining said disk substrate in said disk receiving region, and further capable of rotating said disk substrate retained thereby such that said second and third laser beams may be caused to impact said disk substrate entirely around the circumference of said disk substrate.

16. The apparatus of claim 15, further comprising means causing relative motion between said body and said disk substrate retained by said mandrel such that said motion effects scanning of said second and third laser beams in a direction parallel to a radius of said disk substrate.

17. The apparatus of claim 16 wherein said means for causing relative motion is a motion control apparatus capable of moving said body.

18. An apparatus for simultaneously forming texture features on two target surfaces comprising a first target surface and a second target surface, said target surfaces being located on opposite sides of a generally planar disk substrate of a magnetic recording disk, each such feature formed by the incidence of a laser beam upon the target surface, comprising:

a laser source, said laser source providing a first laser beam;

optics for splitting said first laser beam into a second and a third laser beam, said optics comprising:
  a beam splitter for splitting said first beam into said second beam and said third beam;
  first and second lenses, said first and said second lenses in the path of said second and said third laser beams, respectively, for focusing said second and said third laser beams upon said first and said second target surfaces, respectively, of said disk substrate located in said disk receiving region;
  a plurality of mirrors disposed in the path of said second and said third laser beams, for respectively directing said second and said third laser beams toward said first and said second target surfaces;

a disk receiving region comprising a disk retaining mandrel, said disk retaining mandrel capable of holding said generally planar disk substrate such that said second beam and said third beam are incident upon said first and said second target surfaces in a determined zone of each of said first and said second target surfaces;

wherein at least a portion of said optics moves relative to said laser source to displace a first and second location of incidence of said focused second and third laser beams, respectively, upon said first and second target surfaces, respectively, and wherein said motion relative to said laser source does not affect the focus of the second and third laser beams on the first and second target surfaces, respectively.

* * * * *